United States Patent [19]

Nimke

[11] Patent Number: 4,657,287

[45] Date of Patent: Apr. 14, 1987

[54] GROOVED CONNECTOR

[75] Inventor: Helmut E. Nimke, Tuxedo, N.Y.

[73] Assignee: The Brooklyn Union Gas Company, Brooklyn, N.Y.

[21] Appl. No.: 785,133

[22] Filed: Oct. 7, 1985

Related U.S. Application Data

[63] Continuation-in-part of Ser. No. 613,380, May 29, 1984, Pat. No. 4,549,752, which is a continuation-in-part of Ser. No. 292,455, Aug. 13, 1981, Pat. No. 4,465,309.

[51] Int. Cl.$^4$ .............................................. F16L 21/06
[52] U.S. Cl. .................................... 285/373; 285/381; 285/915; 285/397
[58] Field of Search ..... 285/373, 381, 419, DIG. 915, 285/21, 397, 293

[56] References Cited

U.S. PATENT DOCUMENTS

| | | | |
|---|---|---|---|
| 3,100,658 | 8/1963 | Miller et al. | 285/293 |
| 3,689,114 | 9/1972 | Meserole | 285/419 X |
| 3,770,556 | 11/1973 | Evans et al. | 138/99 X |
| 4,197,880 | 4/1980 | Cordia | 138/99 |
| 4,226,444 | 10/1980 | Bunyan | 285/21 |
| 4,283,079 | 8/1981 | Flaherty | 285/381 |
| 4,310,183 | 1/1982 | Szalvay | 285/381 X |
| 4,310,184 | 1/1982 | Campbell | 285/373 X |
| 4,328,983 | 5/1982 | Gibson | 285/382 |
| 4,377,945 | 3/1983 | Di Giovanni et al. | 138/97 X |
| 4,379,575 | 4/1983 | Martin | 285/381 X |
| 4,394,202 | 7/1983 | Thomas et al. | 138/97 X |
| 4,410,391 | 10/1983 | Thomas et al. | 138/97 X |
| 4,427,031 | 1/1984 | Di Giovanni et al. | 138/97 |
| 4,427,032 | 1/1984 | Di Giovanni et al. | 138/98 |
| 4,427,112 | 1/1984 | Di Giovanni et al. | 138/98 X |
| 4,465,309 | 8/1984 | Nimke et al. | 285/915 X |
| 4,469,357 | 9/1984 | Martin | 285/381 |

Primary Examiner—Thomas F. Callaghan
Attorney, Agent, or Firm—Michael F. Petock

[57] ABSTRACT

A grooved contracting connector is comprised of a resilient sheet member in the form of a coil having a plurality of circumferential grooves in the resilient sheet member coil. In one embodiment, an adhesive is applied to the inner surface of the resilient sheet member coil at least in the area between the grooves. Resilient sheet member coil is expanded to a larger diameter and held in the expanded condition by the heat sensitive bonding material. In connecting together tubular members, the tubular members are inserted, the connector is heated with the heat sensitive adhesive bonding material at least partially melting to allow the connector to contract firmly onto the tubing to form a tight and strong connection upon cooling.

24 Claims, 12 Drawing Figures

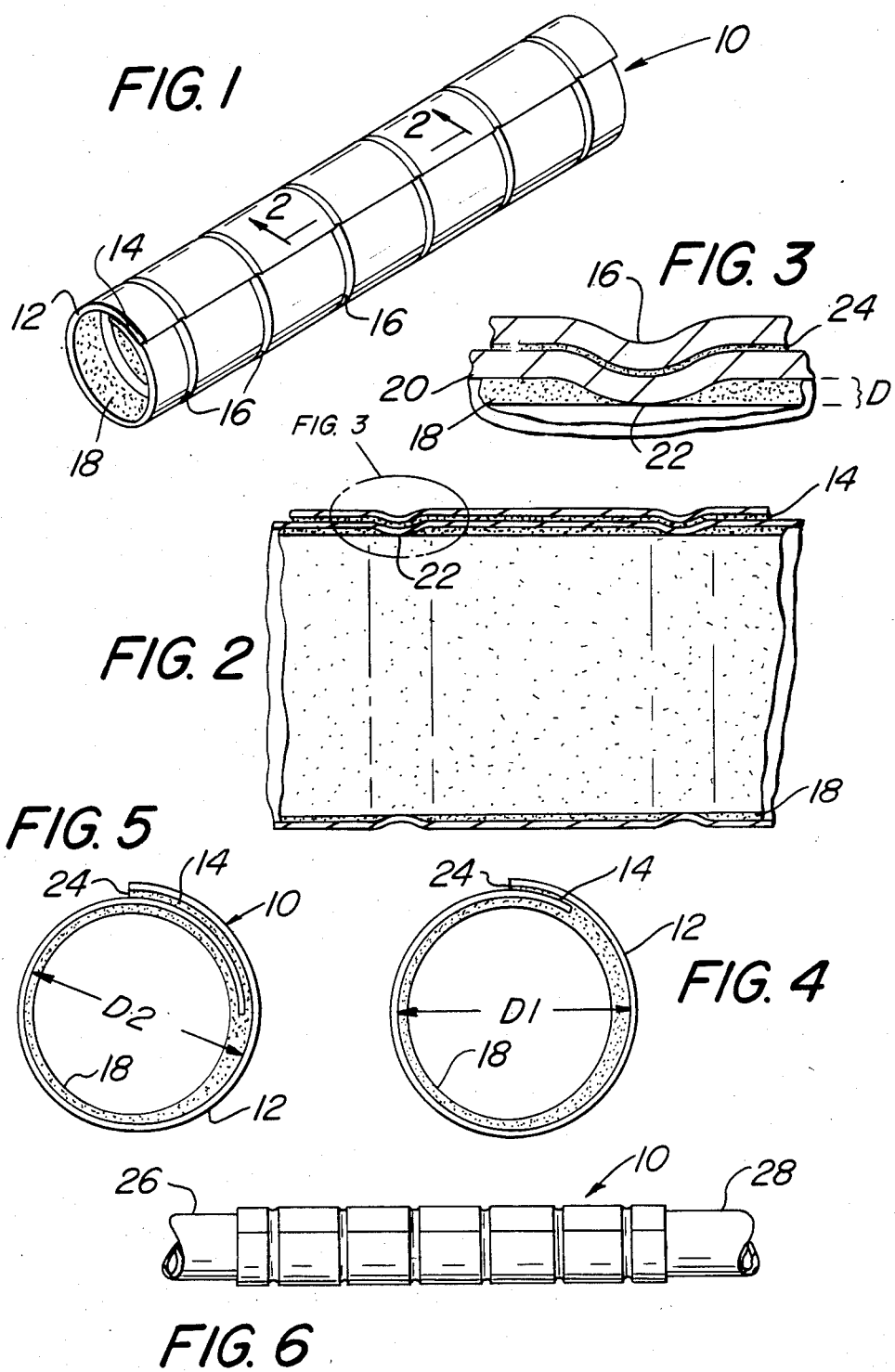

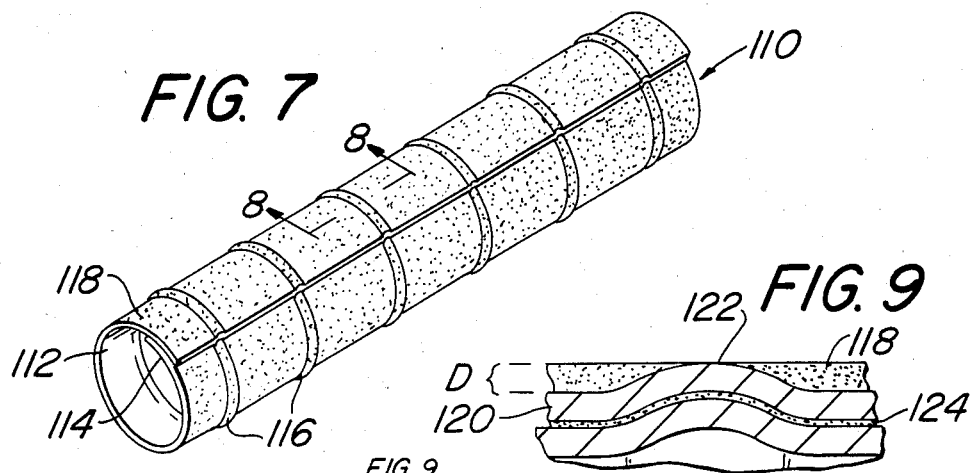
FIG. 7
FIG. 9
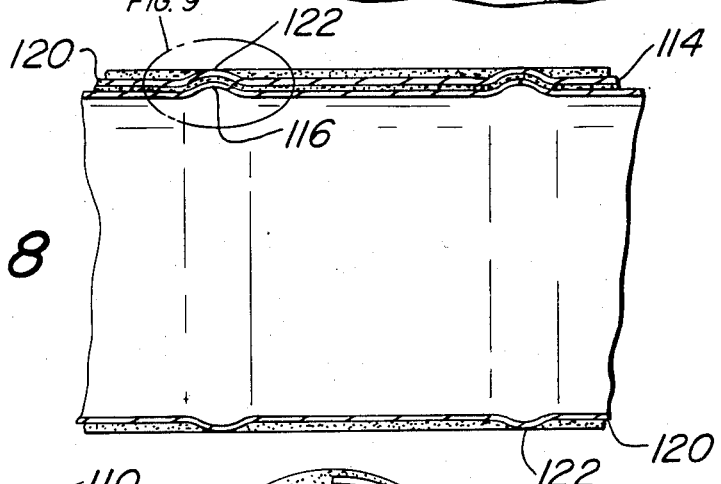
FIG. 8
FIG. 10
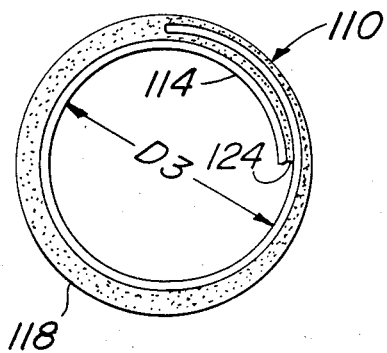
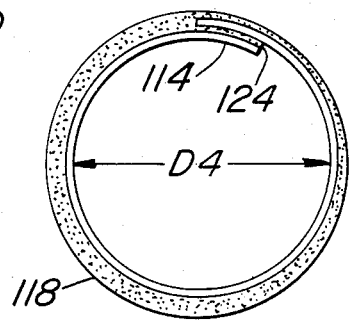
FIG. 11
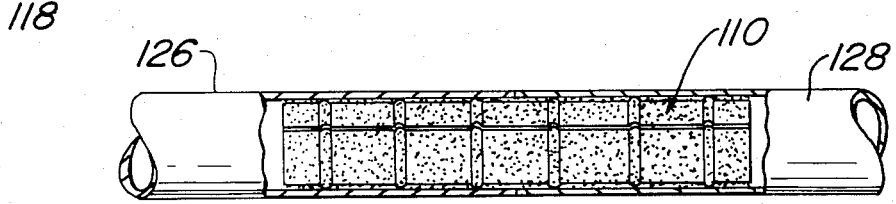
FIG. 12

GROOVED CONNECTOR

CROSS REFERENCE TO RELATED APPLICATION AND PATENT

This application is a continuation-in-part application of application Ser. No. 613,380, filed May 29, 1984 by Helmut E. Nimke and William R. Thomas, entitled CONNECTOR FOR TUBULAR MEMBERS, now U.S. Pat. No. 4,549,752, which was a continuation-in-part application of application Ser. No. 292,455, filed Aug. 13, 1981 by Helmut E. Nimke and William R. Thomas entitled CONNECTING OR REPAIR DEVICE, now U.S. Pat. No. 4,465,309. The subject matter in its entirety of both the parent application and grandparent application is incorporated herein by reference the same as if set forth at length.

BACKGROUND OF THE INVENTION

The present invention relates to improvements in devices used to connect together tubing.

SUMMARY OF THE INVENTION

The present invention enables the connecting together of the ends of tubing or pipes in an improved manner. The present invention provides several significant advantages over the inventions described in the parent and grandparent applications.

Briefly and basically, in accordance with one embodiment of the present invention, a device for connecting together tubular members is provided. The device includes a resilient sheet member in the form of a coil having at least partially overlapping surfaces. The inner diameter of the sheet member coil is less than the outer diameters of the tubular members to be joined. The resilient sheet member coil is provided with a plurality of circumferential grooves in its circumference. The grooves at least partially mate in the area of the overlapping surfaces. A heat sensitive adhesive bonding material is applied to the interior surface of the sheet member coil as expanded to a larger diameter against a resiliently inwardly directed force of the sheet member and held in the expanded condition by the heat sensitive adhesive bonding material applied in a layer having a thickness substantially equal to the height of the groove in the sheet member coil as it projects from the inner surface of the sheet member coil. The expanded larger diameter is of a sufficient diameter to receive the ends of the members to be joined whereby the ends may be easily inserted into the coiled sheet member. Once the tubular members are inserted into the coiled sheet member, the coiled sheet member is heated sufficiently to allow the heat sensitive bonding material to melt. Melting of the heat sensitive bonding material allows the coiled sheet member to contract inwardly forming a tight bond. When the heat sensitive adhesive bonding material cools, a tight bond is formed between the inner surface of the sheet member and the tubular members being joined. In this manner, a strong adhesive mechanically reinforced bond is formed between the inner surface of the coil and the tubular members being joined.

The present invention provides several advantages over the subject matter of U.S. Pat. No. 4,465,309 and application Ser. No. 613,380, now U.S. Pat. No. 4,549,752. These advantages include, inter alia, that the grooves enhance the spring rate of the resilient sheet member coil. The grooves cause an increased clamping action onto the tubing being clamped. The layer of heat sensitive adhesive bonding material may be accurately gauged by the height of the groove projecting from the inner surface of the resilient sheet member coil. The grooves projecting from the inner surface of the resilient sheet member coil prevent or very significantly reduce the possibility of the melted adhesive being squeezed out of the space between the inner surface of the resilient sheet member coil and the outer surface of the tubular members being joined and define the annular space in which adhesive is confined in a uniform distribution when the resilient sheet member coil contracts upon being heated. In other words, the grooves act to dam the flow of adhesive in the confined annular space. Furthermore, the grooves in the sleeve or coil at least partially mate in the area of the overlapping surfaces preventing axial movement of one surface of the sheet coil with respect to the other. This provides an improved reliability in structural arrangement in all applications and may be particularly advantageous when utilized to bond together members which may be of slightly different diameters and particularly where one of the tubular members may be an expandable member as described in aforesaid application Ser. No. 613,380.

In another embodiment of the present invention, the structure is similar to that described with respect to the aforesaid embodiment. However, in this embodiment, the grooved connector is inserted within the ends of the tubing to be joined. The coiled resilient sheet member has a resting diameter which is greater than the inner diameter of the tubing to be joined. This resilient sheet member coil is contracted to a smaller diameter than the inner diameter of the tubing to be joined to allow ease of insertion. Upon heating of the grooved connector, the adhesive in the overlapping area melts allowing the connector to expand to form a tight bond between the outer surface of the grooved connector and the inner surface of the tubing being joined. The adhesive in this embodiment is applied to the outer surface of the grooved expanding connector.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a view in perspective of a grooved contracting connector in accordance with the present invention.

FIG. 2 is a cross-sectional view taken along line 2—2 of FIG. 1.

FIG. 3 is an exploded cross-sectional view of the area within the dotted line identified as FIG. 3 in FIG. 2.

FIG. 4 is an end view of the grooved contracting connector shown in FIG. 1, that is in the expanded state.

FIG. 5 is an end view of a contracting connector in its contracted state after heating.

FIG. 6 is an elevation view of a grooved contracting connector in accordance with the present invention as applied in connecting two tubular members together.

FIG. 7 is a view in perspective of a grooved expanding connector in accordance with the present invention.

FIG. 8 is a cross-sectional view taken along line 8—8 of FIG. 7.

FIG. 9 is an exploded cross-sectional view in the area within the dotted line identified as FIG. 9 in FIG. 8.

FIG. 10 is an end view of the grooved expanding connector as shown in FIG. 1, that is in its contracted state.

FIG. 11 is an end view of a contracting connector in its expanded state after heating.

FIG. 12 is a broken away view of a grooved expanding connector in accordance with the present invention as applied in connecting two tubular members together.

DETAILED DESCRIPTION OF THE PREFERRED EMBODIMENTS

Referring now to the drawings in detail, wherein like numerals indicate like elements, there is shown in FIG. 1 a grooved contracting connector 10 in accordance with the present invention. Grooved contracting connector 10 is comprised of a resilient sheet member 12 in the form of a coil with overlapping surfaces at 14 and a plurality of circumferential grooves 16.

The grooves formed in the sheet member form a bead on the opposite surface of the sheet member. The wording "grooves" or "bead" in the sheet member will be used interchangeably throughout to indicate the circumferential rings formed in the sheet member. In other words, the resilient sheet member coil 12 has at least partially overlapping surfaces at 14 which may form a bonding area between the two ends of the resilient sheet member. Resilient sheet member 12 may be comprised of any suitable resilient metal or synthetic plastic material. Suitable resilient metal sheet material may be stainless steel, brass, bronze, spring steel or other suitable resilient metallic material. Suitable resilient synthetic plastic material may be polyethylene, polyolefin, vinyl or other suitable synthetic materials having the desired resiliency. In a presently preferred embodiment, without limiting the present invention, a stainless steel resilient sheet member has been utilized.

Referring now simultaneously to FIGS. 1 through 4, a heat sensitive adhesive bonding material 18 is applied to the inner surface of sheet member coil 12. As may be best seen in FIG. 3, the grooves 16 in the overlapping portion 14 of the resilient sheet member coil 12 are partially mating. This may be further best seen in FIG. 3, the grooves or beads 16 project from the inner surface 20 or the normal level of the inner surface 20 to a height or distance D. Preferably, the layer 18 of the heat sensitive adhesive bonding material is applied to the expanded coil in a layer having a thickness substantially equal to the height or distance D to which the grooves or beads 16 in the sheet member coil projects from the inner surface 20 of sheet member coil 12. As may be seen, particularly in FIGS. 2 and 3, preferably, the heat sensitive adhesive bonding material is applied to the inner surface 20 between grooves 16. The height D of the grooves or beads 16 may preferably act as a gauge for the thickness of the layer of heat sensitive adhesive bonding material. However, it is understood that a slightly greater thickness may be utilized wherein adhesive 18 would be applied with a somewhat thinner layer over the peak 22 of groove 16 as it projects from the inner surface 20 of sheet member coil 12. It is further noted that the heat sensitive adhesive bonding material 18 is present between the overlapping surfaces 14 as illustrated at 24, although preferably in a thinner layer than is applied to the surface which will come in contact with the tubular members to be joined.

The heat sensitive adhesive bonding material may be any suitable type of heat sensitive adhesive bonding material, including, but not limited to, various ethylene vinyl acetate resins or a commercially available adhesive manufactured by the Bostik Company of Middleton, Mass. and sold under the name Bostik 6322.

As shown in FIG. 6, the grooved contracting connector 10 is utilized to connect together two ends of tubing 26 and 28 as illustrated. The tubing 26 and 28 may be any type of tubular members, pipes, solid cylinders or the like. However, the present invention is particularly applicable to the connecting together of flexible or rigid synthetic plastic tubing or rigid metallic pipe or tubing utilized for the transport of gases or fluids.

As described in the parent and grandparent applications, resilient sheet member coil 12 is formed or constructed to have an unstressed or resting diameter less than the tubing 26 or 28 to be connected or joined. In other words, the inner diameter of grooved contracting connector 10 is less than the outer diameter of the tubing to be connected. In constructing the connector 10, resilient sheet member coil 12 is expanded to a larger inner diameter against the resiliently inwardly directed force of sheet member 12 as shown in FIG. 4. This larger inner diameter is shown as D1 in FIG. 4. In a preferred embodiment, this may provide overlapping surfaces 14 of about one-eighth of a circle or approximately 45 degrees. Connecting device 10 is retained in the form of an expanded diameter by means of the heat sensitive adhesive bonding material 24 which is between the overlapping surfaces 14. The adhesive between the overlapping surfaces 14 may be a separate or different heat sensitive adhesive than the layer 18. Such a separate adhesive may be utilized to provide a different melting temperature for the adhesive of the overlapping surfaces 14 than the melting point of the adhesive 18. However, in the presently preferred embodiment, the same adhesive is utilized along the surface 18 which comes in contact with the tubing to be joined and between the overlapping surfaces 14.

In applying the grooved contracting connector 10 to connect tubing together, heat is applied to the connector 10 which causes the heat sensitive adhesive bonding material to at least partially melt or soften. Upon such melting or softening of the heat sensitive adhesive bonding material, the contracting connector contracts toward its initial resting state. In the preferred embodiment, as shown in FIG. 5, where there is no tubing or other object within the connector to prevent the contracting connector from assuming its resting state, the contracting connector contracts to a diameter D2 where the overlapping surfaces 14 comprise one-fourth of a circle or approximately 90 degrees. However, in actual application of the grooved contracting connector to tubing, such as tubing 26 and 28 shown in FIG. 6, the contracting connector 10 would contract to a lesser degree since it would be restrained by the outer surface of the tubing.

In use, the ends of the tubing 26 and 28 to be joined are inserted into grooved contracting connector 10. In the expanded form of the connecting device 10, as shown in FIG. 4, the ends of the tubing 26 and 28 are easily inserted. Preferably, the ends of the tubing 26 and 28 would abut each other substantially in the center of connecting device 10. Upon application of sufficient heat to resilient sheet member 12, the heat sensitive adhesive bonding materials 18 and 24, which may preferably be the same material, are caused to melt. Prior to the melting, the heat sensitive adhesive bonding material had retained connector 10 in its expanded condition with a diameter of D1 as illustrated in FIG. 4. Upon melting of the heat sensitive adhesive bonding material, the resilient sheet member 12 contracts to a smaller diameter D2 as shown in FIG. 5. At the same time, the heat applied to the resilient sheet member 12 causes the melting of the heat sensitive adhesive bonding material 18 along the inner surface 20 of resilient sheet member coil 12. During the contracting process, the grooves 16, with their peaks 22, prevent the resilient sheet member coil 12 from being compressed so tightly onto the outer surface of the tubing to be joined that the adhesive material 18 becomes unevenly deposited on the tubing. Grooves 16 also prevent any undesired axial movement between the overlapping surfaces 14 since the grooves surfaces are at least partially mating as shown in FIGS. 2 and 3. Upon cooling of the heat sensitive bonding material 18, a tight bond is formed between the inner surface of connector 10 and the tubing 26 and 28. The force applied by the contracting resilient sheet member 12 provides strength to the bond formed between connector 10 and the tubing not only in providing reinforcement at the joint, but by maintaining an inwardly directed force on the bond between resilient sheet member 12 and the outer surface of the tubing. The grooving as shown establishes the deposit of a uniform annular layer of adhesive on the tubing being joined and prevents excessive adhesive from being squeezed out of the lateral ends of connector 10. The grooving beading provides a damming action to prevent the squeezing out of adhesive at the lateral ends.

FIGS. 7 and through 12 illustrate another embodiment of the present invention wherein the structure and function are similar, but reversed in that the connector illustrated in FIGS. 7 through 12 is adapted to be inserted inside of the tubing to be joined and is an expanding, rather than a contracting connector. In this embodiment, the grooves or beads would be outwardly directed on the outer surface of the resilient coiled sheet member and the adhesive would be applied on the outer surface of the sheet member coil to provide a bond between the outer surface of the resilient sheet member coil and the inner surface of the tubing to be joined. The heating may be accomplished by various means well known in the art, including direct heating by the insertion of a heating element into the center of the connector or by various indirect radio frequency and other heating techniques.

Referring to FIG. 7, there is shown a grooved expanding connector 110 comprised of a resilient sheet member 112 in the form of a coil with overlapping surfaces at 114 and a plurality of circumferential grooves 116. The resilient sheet member coil 112 has at least partially overlapping surfaces at 114 which may form a bonding area between the two ends of the resilient sheet member. Resilient sheet member 112 may be comprised of any suitable resilient or synthetic plastic material as described above with respect to resilient sheet member 12.

Referring now simultaneously to FIGS. 7 through 10, a heat sensitive adhesive bonding material 118 is applied to the outer surface of sheet member coil 112. As may be best seen in FIGS. 8 and 9, the grooves 116 in the overlapping portion 114 of the resilient sheet member coil 112 are partially mating. The grooves or beads 116 project from the outer surface 120 to a height or a distance D. Preferably, the layer 118 of the heat sensitive adhesive bonding material is applied to the contracted coil in a layer having a thickness substantially equal to the height or distance D to which the grooves or beads 116 and the sheet member coil project from the outer surface 120 of sheet member coil 112. As may be seen, particularly in FIGS. 8 and 9, preferably, the heat sensitive adhesive bonding material is applied to the outer surface 120 between grooves or beads 116. However, as described above, it is understood that a slightly greater thickness may be utilized wherein the adhesive 118 may be applied with a somewhat thinner layer over the peak 122 of groove or bead 116 as it projects from the outer surface 120 of sheet member coil 112.

As previously described with respect to the other embodiment, the heat sensitive adhesive bonding material 118 is present between the overlapping surfaces 114 as illustrated at 124, although preferably in a thinner layer than is applied to the surface which will come in contact with the tubular members being joined.

The heat sensitive adhesive bonding material may be any suitable type of heat sensitive adhesive bonding material as described above with respect to the other embodiment.

As shown in FIG. 12, the grooved expanding connector 110 is utilized to connect together two ends of tubing 126 and 128 as illustrated. The tubing 126 and 128 may be any type of tubular members, pipes, solid cylinders or the like. However, as described previously, the present invention is particularly applicable to the connecting together of flexible or rigid synthetic plastic tubing or rigid metallic pipe or tubing utilized with transport of gases or fluids. In a manner similar to that described with respect to the other embodiment, but instead of being a contracting connector, an expanding connector is formed by resilient sheet member coil 112 having an unstressed or resting diameter greater than the inner diameter of tubing 126 or 128 to be connected or joined. In other words, the outer diameter of grooved contracting connector 110 is greater than the inner diameter of the tubing to be connected. In constructing connector 110, resilient sheet member coil 112 is contracted to a smaller inner diameter against the resiliently outwardly directed force of sheet member 112 as shown in FIG. 10. This smaller inner diameter is shown as D3 in FIG. 10. In a preferred embodiment, this may provide overlapping surfaces 114 of about one-quarter of a circle or approximately 90 degrees. Connecting device 110 is retained in the form of a contracted diameter by means of the heat sensitive adhesive bonding material 124 which is between the overlapping surfaces 114. The adhesive between the overlapping surfaces 114 may be a separate or different heat sensitive adhesive than layer 118 as described above with respect to the other embodiment.

In applying the grooved expanding connector 110 to connect tubing together, heat is applied to connector 110 which causes the heat sensitive adhesive bonding material to at least partially melt or soften. Upon such melting or softening of the heat sensitive adhesive bonding material, the expanding connector expands toward its initial resting state. In a preferred embodiment, as shown in FIG. 11, where there is no tubing or other object around the connector to prevent the expanding connector from assuming its resting state, the expanding connector expands to a diameter D4 where the overlapping surfaces 114 comprise one-eighth of a circle or approximately 45 degrees. However, in actual application of the expanded contracting connector to tubing, such as tubing 126 and 128 as shown in FIG. 12, the expanding connector 110 would expand to a lesser degree since it would be restrained by the inner surface of the tubing.

In use, the ends of the tubing 126 and 128 to be joined are received over grooved expanding connector 110. In the contracted form of contracting device 110, as shown in FIG. 10, the ends of the tubing 126 and 128 are easily received over the connector. Preferably, the ends of tubing 126 and 128 would abut each other substantially over the center of connecting device 110. Upon application of sufficient heat to resilient sheet member 112, the heat sensitive adhesive bonding materials 118 and 124, which would preferably be the same material, are caused to melt. Prior to the melting, the heat sensitive adhesive bonding material had retained connector 110 in its contracted condition with a diameter of D3 as illustrated in FIG. 10. Upon melting of the heat sensitive adhesive bonding material, the resilient sheet member 112 expands to a larger diameter D4 as shown in FIG. 11. At the same time, the heat applied to the resilient sheet member 112 causes the melting of the heat sensitive adhesive bonding material 118 along the outer surface 120 of resilient sheet member coil 112. During the expanding process, the grooves 116 with their peaks 122, prevent the resilient sheet member coil 112 from being compressed so tightly against the inner surface of the tubing to be joined that the adhesive material 118 becomes unevenly deposited on the inner surface of the tubing. Grooves 116 also prevent any undesired axial movement between the overlapping surfaces 114 since the grooved surfaces are at least partially mating as shown in FIGS. 8 and 9. Upon cooling of the heat sensitive bonding material 118, a tight bond is formed between the outer surface of connector 110 and the inner surface of tubing 126 and 128. The force applied by the expanding resilient sheet member 112 provides strength to the bond formed between connector 110 and the tubing not only in providing reinforcement at the joint, but by maintaining an outwardly directed force on the bond between resilient sheet member 112 and the outer surface of the tubing. The grooving as shown establishes the deposit of a uniform annular layer of adhesive on the tubing being joined and prevents excessive adhesive from being squeezed out of the lateral ends of connector 110. The grooving provides a damming action to prevent the squeeze out of adhesive at the lateral ends.

It is understood that various modifications and dimensions may be utilized in practicing the present invention, the connector may be utilized for various sizes of tubing, and the dimensions will vary in both diameter and length. Furthermore, the depth of the grooves may be selectively adjusted. However, in a presently preferred embodiment of the contracting connector, without in any way limiting the scope of the present invention, in one example of the present invention, the inner diameter of the resilient sheet member in the contracted condition may be 1.16 inches and the inner diameter in the expanded condition may be 1.32 inches. The contracting connector may be constructed to have a length of six inches with the six grooves as shown in FIG. 1 being spaced 1 inch apart with one-half of an inch between the outermost groove and the end of the connector on each side. A presently preferred dimension for the groove depth D is approximately 0.015 inch with a stainless steel resilient sheet member having a thickness of approximately 0.010 inch. Again, these dimensions have been provided as a presently preferred illustration of the present invention, but it is understood that these dimensions may well vary from time to time and in various applications.

In view of the above, the present invention may be embodied in other specific forms without departing from the spirit or essential attributes thereof and, reference should be made to the appended claims, rather than to the foregoing specification as indicating the scope of the invention.

I claim:

1. A device for connecting together tubular members, comprising:

a resilient sheet member in the form of a coil having at least partially overlapping surfaces, the diameter of said sheet member coil being of a predetermined diameter to receive the tubular members to be joined;

said resilient sheet member coil being provided with a plurality of circumferential grooves in its circumference, said grooves of said sheet member coil forming beads on the opposite surface of said sheet member, said grooves at least partially mating in the area of said overlapping surfaces;

a heat sensitive adhesive bonding material applied to a surface of said sheet member coil, said heat sensitive adhesive bonding material being applied in a layer on the surface of said sheet member coil adapted to adhesively contact the tubular members except for peaks of the projecting surfaces of the beads and having a thickness substantially equal to the height of the beads in the sheet member coil as they project from the surface of said sheet member coil; and said sheet member coil being forced to a first diameter against a resiliently directed force of said sheet member and held in said condition by said heat sensitive adhesive bonding material, the first diameter being of a predetermined diameter to receive the ends of said members to be joined, whereby said ends may be easily inserted into or over said coiled sheet member, said coiled sheet member being heatable whereby said heat sensitive adhesive bonding material holding said coil at said first diameter melts allowing said sheet member to change to a second diameter forming a tight bond between the surface of said sheet member bearing said adhesive and said members to be joined to form a strong bond upon cooling of said heat sensitive bonding material between said surface of said coil and said tubular members being joined with said resilient sheet member coil providing support.

2. A device for connecting together tubular members in accordance with claim 1 wherein said resilient sheet member is comprised of stainless steel.

3. A device for connecting together tubular members in accordance with claim 1 wherein said stainless steel resilient sheet member has a thickness of 0.010 inch.

4. A device for connecting together tubular members in accordance with claim 3 wherein said beads in said resilient sheet member project from the surface of said sheet member coil a distance of approximately 0.015 inch.

5. A device for connecting together tubular members in accordance with claim 1 wherein said heat sensitive adhesive bonding material is applied to a surface of said resilient sheet member coil between said beads.

6. A device for connecting together tubular members in accordance with claim 1 wherein said resilient sheet member coil is provided with at least two grooves.

7. A device for connecting together tubular members in accordance with claim 1 wherein said resilient sheet member coil is provided with six grooves.

8. A device for connecting together tubular members in accordance with claim 1 wherein said heat sensitive adhesive bonding material is comprised of an ethylene vinyl acetate resin.

9. A device for connecting together tubular members, comprising:
- a resilient sheet member in the form of a coil having at least partially overlapping surfaces, the inner diameter of said sheet member coil being less than the outer diameters of the tubular members to be joined;
- said resilient sheet member coil being provided with a plurality of circumferential grooves in its circumference, said grooves of said sheet member coil forming beads on the opposite surface of said sheet member, said grooves at least partially mating in the area of said overlapping surfaces;
- a heat sensitive adhesive bonding material applied to the inner surface of said sheet member coil, said heat sensitive adhesive bonding material being applied in a layer on the surface of said sheet member coil adapted to adhesively contact the tubular members except for peaks of the inwardly projecting surfaces of the beads and having a thickness substantially equal to the height of the beads in the sheet member coil as they project from the inner surface of said sheet member coil; and
- said sheet member coil being expanded to a larger diameter against a resiliently inwardly directed force of said sheet member and held in said expanded condition by said heat sensitive adhesive bonding material, the expanded larger diameter being of a sufficient diameter to receive the ends of said members to be joined, whereby said ends may be easily inserted into said coiled sheet member, said coiled sheet member being heatable whereby said heat sensitive adhesive bonding material holding said coil expanded melts, allowing said sheet member to contract inwardly forming a tight bond between the inner surface of said sheet member and said members to be joined to form a strong bond upon cooling of said heat sensitive bonding material between said inner surface of said coil and said tubular members being joined with said resilient sheet member coil providing support.

10. A device for connecting together tubular members in accordance with claim 9 wherein said resilient sheet member is comprised of stainless steel.

11. A device for connecting together tubular members in accordance with claim 9 wherein said stainless steel resilient sheet member has a thickness of 0.010 inch.

12. A device for connecting together tubular members in accordance with claim 11 wherein said beads in said resilient sheet member project from the inner surface of said sheet member coil a distance of approximately 0.015 inch.

13. A device for connecting together tubular members in accordance with claim 9 wherein said heat sensitive adhesive bonding material is applied to the inner surface of said resilient sheet member coil between said beads.

14. A device for connecting together tubular members in accordance with claim 9 wherein said resilient sheet member coil is provided with at least two grooves.

15. A device for connecting together tubular members in accordance with claim 9 wherein said resilient sheet member coil is provided with six grooves.

16. A device for connecting together tubular members in accordance with claim 9 wherein said heat sensitive adhesive bonding material is comprised of an ethylene vinyl acetate resin.

17. A device for connecting together tubular members, comprising:
- a resilient sheet member in the form of a coil having at least partially overlapping surfaces, the outer diameter of said coil member being greater than the inner diameters of the tubular members to be joined;
- said resilient sheet member coil being provided with a plurality of circumferential grooves in its circumference, said grooves of said sheet member coil forming beads on the opposite surface of said sheet member, said grooves at least partially mating in the area of said overlapping surfaces;
- a heat sensitive adhesive bonding material applied to the outer surface of said sheet member coil, said heat sensitive adhesive bonding material being applied in a layer on the surface of said sheet member coil adapted to adhesively contact the tubular members except for peaks of the outwardly projecting surfaces of the beads and having a thickness substantially equal to the height of the beads in the sheet member coil as they project from the outer surface of said sheet member coil; and
- said sheet member coil being contracted to a smaller diameter against a resiliently outwardly directed force of said sheet member and held in said contracted condition by said heat sensitive adhesive bonding material, the contracted smaller diameter being of a sufficiently small diameter to receive the ends of said members to be joined, whereby said ends may be easily inserted over said coiled sheet member, said coiled sheet member being heatable whereby said heat sensitive adhesive bonding material holding said coil contracted melts allowing said sheet member to expand outwardly forming a tight bond between the outer surface of said sheet member and said members to be joined to form a strong bond upon cooling of said heat sensitive adhesive bonding material between said outer surface of said coil and said tubular members being joined with said resilient sheet member coil providing support.

18. A device for connecting together tubular members in accordance with claim 17 wherein said resilient sheet member is comprised of stainless steel.

19. A device for connecting together tubular members in accordance with claim 17 wherein said stainless steel resilient sheet member has a thickness of 0.010 inch.

20. A device for connecting together tubular members in accordance with claim 19 wherein said beads in said resilient sheet member project from the outer surface of said sheet member coil a distance of approximately 0.015 inch.

21. A device for connecting together tubular members in accordance with claim 17 wherein said heat sensitive adhesive bonding material is applied to the outer surface of said resilient sheet member coil between said beads.

22. A device for connecting together tubular members in accordance with claim 17 wherein said resilient sheet member coil is provided with at least two grooves.

23. A device for connecting together tubular members in accordance with claim 17 wherein said resilient sheet member coil is provided with six grooves.

24. A device for connecting together tubular members in accordance with claim 17 wherein said heat sensitive adhesive bonding material is comprised of an ethylene vinyl acetate resin.

* * * * *